Nov. 17, 1953     W. A. CODA     2,659,595
SHOCK ABSORBER
Filed May 5, 1951
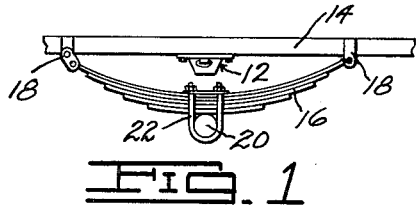
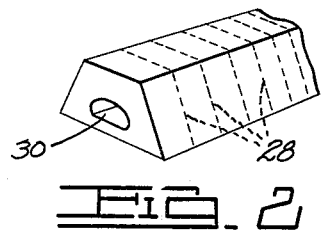
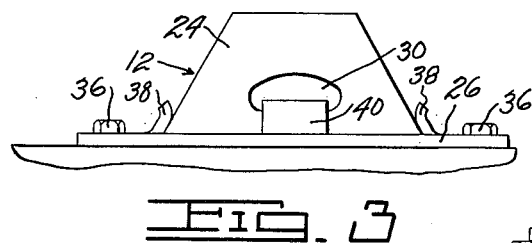
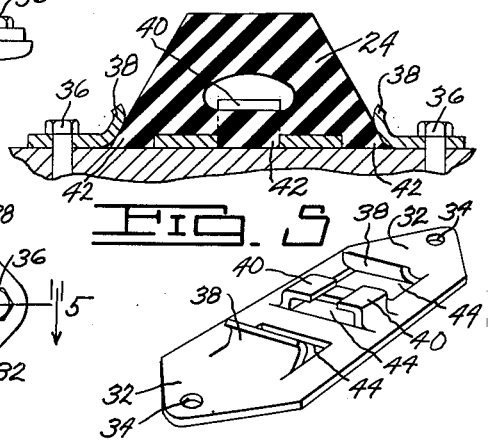
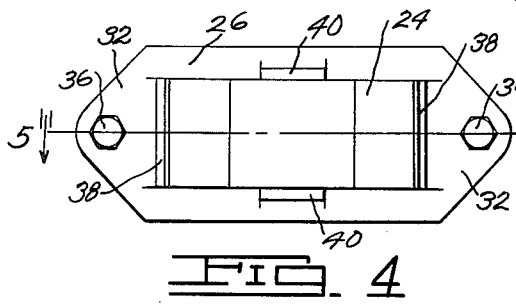
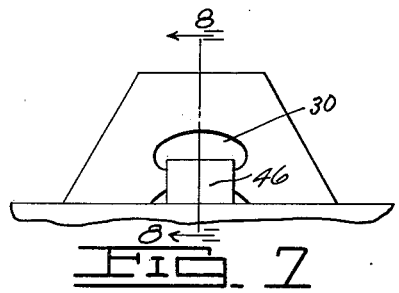
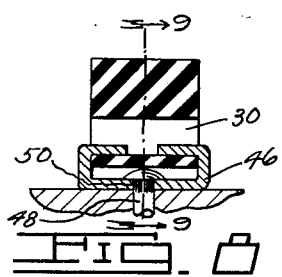
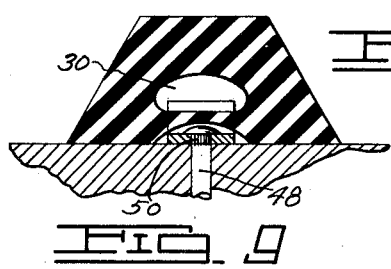
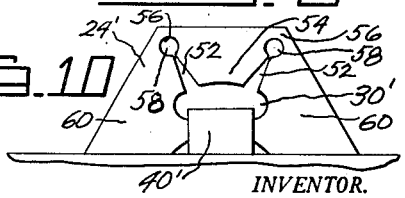
INVENTOR.
WILLIAM A. CODA.
BY
*LaRue W. Vatce.*
HIS ATTORNEY

Patented Nov. 17, 1953

2,659,595

UNITED STATES PATENT OFFICE 2,659,595

SHOCK ABSORBER

William A. Coda, Kingsville, Ontario, Canada

Application May 5, 1951, Serial No. 224,695

4 Claims. (Cl. 267—30)

This invention relates to a shock absorber and more particularly to a snubber for use between impact members to cushion the force of the impact.

The invention has been illustrated as applied to the relatively movable parts of a spring suspension assembly of an automotive vehicle.

In a spring suspension structure of an automobile, the portion of the spring attached to the automobile axle approaches the frame during flexing of the spring and under heavy and sudden shock a portion of the spring strikes the frame.

Heretofore, resilient means in the form of metallic springs or rubber cushioning blocks have been applied between the parts, to either the frame or spring, to absorb the force of the impact when the parts strike each other.

It is an object of the present invention to provide an improved snubber which is economical to manufacture, less expensive, and one in which the resiliency varies in proportion to the impact force; that is, the resiliency of the device is more pliable at the beginning of the shock and becomes more rigid as the load increases.

Another object of the invention is to design the snubber member in such a manner that many such parts may be formed from a single strip of material which may be extruded and the individual pieces cut from the extruded strip, after which the individual pieces may be readily assembled to a backing plate for attachment to a part of the vehicle or other impact member.

A further object of the invention is to construct the snubber in such a manner that under slight shock the device is comparatively more resilient than under heavy shock and to utilize the features of the design which provide the variable resistance for securing the resilient member to a backing plate, the latter being readily attached to one of the relatively movable parts.

Other objects and advantages of the invention will be more fully understood from the following description taken in connection with the accompanying drawings, in which;

Fig. 1 is a fragmentary view of an automobile spring suspension showing one application of my improved device;

Fig. 2 is a fragmentary view, in perspective, of a strip of extruded material from which the individual resilient members are cut;

Fig. 3 is an enlarged, side elevational view of the improved snubber;

Fig. 4 is a top plan view of Fig. 3;

Fig. 5 is a cross sectional view taken on line 5—5 of Fig. 4;

Fig. 6 is a perspective view of the attaching plate to which the resilient member is applied;

Fig. 7 is a side elevational view of a modified form of the device;

Fig. 8 is a cross sectional view taken on line 8—8 of Fig. 7;

Fig. 9 is a cross sectional view taken on line 9—9 of Fig. 8; and

Fig. 10 is a side elevational view of a further modified form of the snubber.

Referring to the drawings, I have shown the snubber assembly 12 as applied to the chassis frame 14 of an automobile having a spring 16 supported to the frame through spring shackles 18. The central portion of the spring 16 is secured to the axle 20 by U bolts 22. Under load or sudden shock the spring 16 is deflected and the axle 20 approaches the frame 14 and often causes the spring to strike the frame with an impact force which is undesirable. It is therefore desirable to provide a cushioning member between the frame and spring to receive and cushion the shock.

I am aware of prior constructions wherein solid resilient blocks have been secured to one of the parts to strike the other for absorbing shock, but these devices have been expensive to manufacture and soon become disassembled and lost, particularly those wherein a rubber block is bolted to the part or the rubber block vulcanized to a plate which is attached to the part.

The snubber assembly 12 comprises a resilient block 24, preferably of rubber, secured to a backing plate 26. The resilient block is formed by the extrusion method wherein the material is forced through a suitable die to obtain a continuous strip having its outer walls formed to the desired shape and size of the finished block. Such a strip is illustrated in Fig. 2. The strip is then cut into sections of desired width as indicated by the dotted lines 28 in Fig. 2. During the extrusion process an opening 30 is formed in the material by arranging a mandrel in the die. The opening is oval in shape and has a flat bottom wall spaced from the bottom wall of the extruded material.

The resilient member 24, when cut from the extruded strip, has parallel end walls, upwardly converging side walls and parallel top and bottom walls, with an oval aperture 30 through the body. The oval aperture 30 gives initial resiliency to the body, the deflection of the body being imparted to the side walls during initial compression and as soon as the upper wall of the oval strikes the bottom wall the block then acts as a solid member. Thus, during initial compression the block has one degree of resiliency and during final compression the block has a lesser degree of resiliency.

The block, as shown, is mounted on a backing plate 26, the latter being secured to a support such as an automobile frame. The backing plate 26 is formed by stamping from a sheet metal plate. It is best shown in Fig. 6. The plate 26 is substantially rectangular having its opposite end portions 32 tapered and each provided with an opening 34 for receiving a bolt 36 which secures the plate to the support. Adjacent each end portion, and stamped from the body of the plate, is a curled flange 38 extending upwardly from the plane of the plate. Oppositely disposed flanges 40 are stamped from the central portion of the plate body. As originally stamped these flanges 40 extend at right angles to the plane of the plate adapted to be bent inwardly, as shown on the drawing, into the aperture 30 for securing the resilient block 24 to the plate. The curled flanges 40 serve as positioning means for the resilient block 24. The flanges 38 are curled outwardly at their outer ends to present a smooth surface for the side walls of the block 24 when the block material is extended outwardly due to compression.

The bottom surface of the resilient block 24 may be smooth, as shown in Fig. 2, or it may be extruded with projections 42 substantially equal in height to the thickness of the backing plate 26 to fit the openings 44 formed by the stamped out flanges 38 and 40, as shown in Fig. 5.

If it is desired to secure the assembly to a support by a single bolt, the backing plate may be made from flat sheet material in the form of a U strap 46 with the outer ends of the U bent inwardly into the opening 30, as shown in Figs. 7, 8 and 9. The securing bolt 48 is extended through the central portion of the base of the U strap 46 and may be staked therein by knurling 50. This method of securing the assembly is desirable in securing a frustum block to a support and may be quickly and easily installed.

In the form of the invention shown in Fig. 10, I have shown a resilient block 24' formed with V slots 52 extending from the oval opening 30' toward the outer surfaces of the block 24'. The V slots diverge outwardly providing a central wedge shaped portion 54 connected to the side portions of the block by a strip 56 surrounding an annular opening 58 at the apex of the V. This design provides an extremely resilient block at the beginning of compression which gradually increases in rigidity under greater compression forces. During the initial movement the wedge shaped portion 54 is moved downwardly with its tapered side walls engaging the tapered side walls at the opposite sides of the V groove. The rigidity of the block is increased by the resistance of the material in the solid side portions 60 of the block. The rigidity of the block is further increased when the bottom wall of the wedge portion 54 strikes the inwardly turned flanges 40'.

The degree of resiliency may be varied by varying the size and shape of the opening 30 so that the proper design may be made for use under predetermined conditions.

The complete assembly comprises essentially two parts, one a cut off section from an extruded part, and another a sheet metal stamping. The parts are secured together by crimping flanges of the stamping over a portion of the cut off section, thus making the assembly easy and accurate and inexpensive.

It will be understood that various changes, including the size, shape and arrangement of parts, may be made without departing from the spirit of my invention and it is not my intention to limit its scope other than by the terms of the appended claims. While the device has been illustrated as applied to an automobile, it has utility in other applications where it is desired to cushion relatively moving parts.

I claim:

1. A shock absorber comprising a plate member, a first pair of upwardly extending flanges struck out of the body portion of said plate and spaced longitudinally thereof, a second pair of upwardly extending flanges struck out of the body portion of said plate and spaced transversely thereof between said first pair of flanges, and an apertured rubber block on said plate between both pair of said flanges, one pair of flanges being bent inwardly into the aperture of said block.

2. A shock absorber comprising a plate member having openings therethrough for receiving securing means, a first pair of upwardly extending flanges having outwardly curved ends struck out of the body portion of said plate and spaced longitudinally of the body portion, a second pair of upwardly extending flanges struck out of the body portion of said plate and spaced transversely thereof between said first pair of flanges, and a rubber block carried by said plate, said block having a pair of parallel side walls and an opening therethrough from one side wall to the opposite side wall, said second pair of flanges being bent inwardly into the opening of said block for retaining said block to said plate.

3. A rubber block for an impact member having parallel upper and lower faces, tapered end faces and parallel side faces, said block being further provided with an opening therethrough from one side face to the opposite side face, and V-shaped cut away portions intersecting the opening and extending toward the upper corners of said block with the apex of the V terminating short of the outer surfaces of said block.

4. A shock absorber comprising a plate member, a pair of outwardly and oppositely disposed flanges struck out of the body portion of said plate, and an apertured rubber block on said plate between said flanges, the pair of flanges being bent inwardly into the aperture of the block.

WILLIAM A. CODA.

References Cited in the file of this patent

UNITED STATES PATENTS

| Number | Name | Date |
|---|---|---|
| 1,433,851 | Schumacher | Oct. 31, 1922 |
| 1,563,040 | Preston | Nov. 24, 1925 |
| 1,571,713 | Emery | Feb. 2, 1926 |
| 1,576,874 | Stevens | Mar. 16, 1926 |
| 1,771,309 | Pattison | July 22, 1930 |
| 2,073,617 | Armington | Mar. 16, 1937 |
| 2,121,876 | Lee | June 28, 1938 |
| 2,596,780 | Meyers et al. | May 13, 1953 |